United States Patent [19]

Suzuki et al.

[11] Patent Number: 5,573,876

[45] Date of Patent: Nov. 12, 1996

[54] METHOD FOR MANUFACTURING COLOR FILTER AND LIQUID CRYSTAL DISPLAY

[75] Inventors: Tameyuki Suzuki, Zushi; Akira Kubo, Kobe, both of Japan

[73] Assignee: Shinto Paint Co., Ltd., Amagasaki, Japan

[21] Appl. No.: 393,651

[22] Filed: Feb. 24, 1995

[30] Foreign Application Priority Data

Mar. 18, 1994 [JP] Japan ................................ 6-073855

[51] Int. Cl.[6] .................................................. G03F 9/00
[52] U.S. Cl. ............................ 430/7; 430/311; 430/321; 430/20
[58] Field of Search ................................ 430/7, 20, 311, 430/322, 324, 325, 321

[56] References Cited

U.S. PATENT DOCUMENTS

| | | | |
|---|---|---|---|
| 4,812,387 | 3/1989 | Suzuki et al. | 430/20 |
| 4,873,175 | 10/1989 | Suzuki et al. | 430/20 |
| 5,279,923 | 1/1994 | Hiro et al. | 430/270 |
| 5,403,698 | 4/1995 | Tachiki et al. | 430/286 |

FOREIGN PATENT DOCUMENTS 0472210  2/1992  European Pat. Off. .

*Primary Examiner*—Geraldine Letscher
*Attorney, Agent, or Firm*—Watson Cole Stevens Davis P.L.L.C.

[57] ABSTRACT

A color filter having, on a surface of a substrate, colored coating films formed by electro-deposition using a photosensitive material and functional coating films between the gaps of the colored coating films formed by exposure to light from the back side of the substrate using a photosensitive, coating film-forming resin composition is superior in optical properties and reliability, surface-flatness, clearness in coloration and color contrast and is free from leakage of light by highly precise formation of the colored coating films and functional coating films.

9 Claims, No Drawings

METHOD FOR MANUFACTURING COLOR FILTER AND LIQUID CRYSTAL DISPLAY

The present invention relates to a method for manufacturing a color filter and a liquid crystal display. More particularly, the invention relates to a novel method for manufacturing a color filter having colored coating films and functional coating films in the gap thereof, and a method for manufacturing a liquid crystal display using said color filter.

A liquid crystal display has so far been used in the so-called pocket-sized television and the like. However, the size of liquid crystal displays has rapidly been enlarged in recent years. The image quality of liquid crystal displays has been improved by the development from TN liquid crystals to STN liquid crystals and active driving elements exemplified by TFT, which has enabled the commercialization of goods with a liquid crystal display having as high image quality as cathoderay tubes. Various studies have been conducted for improving the image quality and productivity of color filter usable for the production of color liquid crystal displays. Of these studies, the method for forming a functional coating film having light screening function or the like called a black matrix that prevents light leakage and improves the image quality are of great concern.

As the method for forming the functional film in the gap between the colored coating films of color filter, there are known methods utilizing printing techniques such as silk screening method, offset method, etc.

There are also known methods for manufacturing a color filter by an electrodeposition method. For example, U.S. Pat. No. 4,873,175 discloses a method which comprises forming a light-screening precoat film on parallel stripe-form electroconductive circuits formed on a surface of a substrate, coating a negative photoresist composition capable of giving a functional coating film onto whole surface of the substrate including the precoat, exposing the resulting coating film to light from the opposite side of the electroconductive circuits-carrying surface of the substrate, the precoat film functioning as a photomask, eliminating both the unexposed part of the photoresist composition and the precoat film to form a desired functional film in the gaps between the conductive circuits, and thereafter forming colored coating films by electrodeposition. On the other hand, U.S. Pat. No. 4,812,387 discloses a method which comprises first forming colored coating films by electrodeposition, and then forming functional coating films in the gaps between the colored coating films in a manner similar to the above back light-exposure method, provided that the colored coating films function as a photomask.

However, the above-mentioned prior art printing methods are disadvantageous in that the stripe distance is so long as about 100 μm or more and the colored coating films and the functional films obtained thereby are not good in surf! ace flatness and dimensional accuracy.

Taking notice of the fact that the methods comprising the electrodeposition method to form colored coating films and the back light-exposure method to form the functional films are more advantageous from industrial viewpoint, and can realize a selective formation of colored coating films only on electroconductive circuits with a high precision and moreover superior in surface flatness and dimensional accuracy to the prior art printing methods, the present inventors extensively studied a method for manufacturing a color filter particularly having more excellent surface flatness advantageously from the industrial point of view. As a result, it was found that the object can be achieved by carrying out the electrodeposition by the use of a photo-sensitive material. Based on this finding, the present invention was accomplished.

The present invention provides:

a method for manufacturing a color filter having colored coating films and functional coating films in the gaps between the colored coating films on a substrate, which comprises step (a) of forming the colored coating films by an electrodeposition method using a substrate having electroconductive circuits on the surface thereof and an electrodeposition bath containing a photosensitive material, and step (b) of forming the functional coating films by forming a coating film using a photosensitive, functional coating film-forming resin composition on whole surface of the substrate including the colored coating films, if any, and then exposing the coating film to light emitted from the opposite side of the circuits-carrying surface of the substrate, followed by development, the steps (a) and (b) being carried out in this order or vice versa; and a method for manufacturing a liquid crystal display which comprises using a color filter manufactured by one of the above-mentioned methods.

The present invention is explained below in more detail.

In manufacturing a color filter according to the method of the present invention, the formation of the colored coating films and the formation of the functional coating films can be carried out in this order in a manner, for example, as described in U.S. Pat. No. 4,873,175, which comprises the steps of:

(i) coating electroconductive circuits patterned on a substrate with a chemical agent-soluble light-screening coating material to form a light screening precoat film, (ii) coating the whole surface of the substrate including the precoat film with a photosensitive, functional film-forming resin composition to form a coating film, (iii) exposing the coating film to light emitted from the opposite side of the circuits-carrying surface of the substrate, (this exposing procedure is hereinafter referred to as back light-exposure method, for brevity.), (iv) eliminating the unexposed part of the coating film of (ii) and the light screening precoat film of (i), and subsequently (v) forming colored coating films by electro-deposition.

Alternatively, the formation of the colored coating film and the formation of the functional coating film can be carried out in reverse order in a manner, for example, as described in U.S. Pat. No. 4,812,387, which comprises the steps of:

(1) forming colored coating films on said electroconductive circuits by electrodeposition, (2) forming the coating film on the whole surface of the substrate including said colored coating films in a manner similar to the above (ii), (3) exposing the coating film to light in a manner similar to the above (iii), and subsequently (4) eliminating the unexposed part of the coating film of (2) located on the colored coating films of (1).

The above-mentioned two manners are only examples for realizing the formation of the colored coating films and the formation of the functional coating films in this order or vice versa.

The method of the present invention is characterized in that the electrodeposition is carried out by the use of a photosensitive material in the electrodeposition bath.

The photosensitive material includes (1) polymers having photiosensitivity and function as a binder in the electrodeposition, and (2) compositions comprising a photosensitive compound and a polymer having function as a binder.

The polymers having photosensitivity and function as a binder are well known, as exemplified by the polymers obtained by reacting a hydroxyl group-containing monomer having a (meth)acryloyl group such as 2-hydroxyethyl acrylate, 2-hydroxyethyl methacrylate and the like with maleinated linseed oil, polybutadiene or the like to form half ester products; the polymers obtained by reacting (meth) acrylic acid or the like with an epoxy group-containing polymer and subsequently reacting therewith a polybasic acid such as dibasic acid, tribasic acid or the like to form ester products (as said polybasic acid, anhydrides of polybasic acids such as succinic anhydride, trimellitic anhydride and the like are preferable from the industrial point of view); the polymers obtained by reacting glycidyl (meth)acrylate or the like with a polymer having a high acid value; the polymers obtained by reacting a hydroxyl group-containing monomer such as hydroxyethyl acrylate or the like with a water-soluble polyester resin in the presence of a diisocyanate; etc.

The polymer having function as a binder includes carboxyl group-containing polymers of maleinated oil type, acrylic type, polyester type, polybutadiene type, polyolefin type, epoxy type and the like. The photosensitive compound which can be used in combination with the polymer having function as a binder includes polyfunctional (meth)acrylates such as trimethylolpropane tri(meth)acrylate, ditrimethylolpropane hexa(meth)acrylate and the like; and oligomers such as urethane (meth)acrylate, polyester (meth)acrylate and the like.

These photosensitive materials preferably have an acid value of from 15 to 150 mg KOH/g and a double bond content (degree of unsaturation) of from 0.1 to 5 moles/kg.

In preparing the electrodeposition bath, it is preferable to use a known photo initiator of benzoin type, anthraquinone type or the like. The amount of said photo initiator preferably falls within the range of from 0.1 to 10% by weight. As the photo initiator, water-insoluble photo initiators are preferred.

For the purpose of improving dilution property, electrophoretic property, leveling property, etc., an organic solvent of alcohol type, cellosolve type, ester type, hydrocarbon type or the like can be used. Further, other known assistants such as antifoaming agent, coating film leveling agent and the like may be added as occasion demands.

The electrodeposition bath can be prepared in a manner known per se, for example, by blending the photo-sensitive material, coloring materials such as dye, pigment and the like and the above-mentioned optionally used materials, treating the blended mixture with an organic amine when an anionic type electrodeposition is carried out, and diluting the mixture thus obtained with deionized water. As the organic amine, alkylamines such as triethylamine and the like or alkanolamines such as diethanolamine and the like are preferable. The amount of organic amine preferably falls within the range of from 0.3 to 2 moles and more preferably from 0.5 to 1.2 moles per mole of the carboxyl group present in the photosensitive material.

The electrodeposition can be carried out in a manner known per se, for example, by introducing the prescribed substrate into the thus prepared bath and, in case of anionic electrodeposition, applying a direct current voltage by using the electroconductive circuits patterned on the substrate as positive electrode and a corrosion-resistant electroconductive material such as stainless steel or the like as a counter electrode. As a result of this electrodeposition, colored coating films are selectively formed on the electroconductive circuits with high precision.

The thickness of the colored coating films can be controlled by changing the conditions of electrodeposition. Usually, the time period of electrodeposition ranges from about 1 second to about 3 minutes at a voltage of 10–300 V. After formation of the colored coating films, the films are preferably washed thoroughly in order to remove unnecessary materials therefrom. If desired, the films thus formed are heat-treated at 100°–280° C. for 10–120 minutes, whereby the film strength can be enhanced.

When the formation of functional coating films has been carried out prior to the formation of colored coating films, both the functional coating films and the colored coating films are thoroughly washed and then air-dried at 30°–150° C. for 1–30 minutes, and thereafter exposed to light by the back light-exposure method, followed by development to remove the colored coating films which may possibly be formed on the functional coating film upon the electrodeposition. In this case, the light-exposure and the development may be carried out in a manner known per se, or the conditions adopted for formation of functional coating film which will be described below maybe adopted.

In the present invention, the formation of functional coating films can be carried out according to a method which is well known in itself. For example, it can be carried out in the following manner.

A preferable example of the photosensitive, functional coating film-forming resin compositions is a negative photoresist composition capable of imparting function such as a light-screening property.

The negative photoresist composition may be any composition so far as the unexposed part thereof can be dissolved and eliminated by development, and include those containing acrylic type, urethane type, epoxy type or polyvinyl alcohol type resin, rubber or gelatin and a photopolymerization initiator of benzophenone type, anthraquinone type etc. Commercially available products such as OMR-83 (trade name, manufactured by Tokyo Ohka Co., Ltd.), and those marketed as a photosensitive coating material or ink may be appropriately selected and used.

The above-mentioned negative photoresist composition is blended with black coloring materials such as a metal oxide black pigment, other black pigments such as carbon black or bismuth sulfide, or black dyes, etc.

If desired, the composition may contain a reactive diluent, a reactive initiator, a photosensitizer, an adhesion improver, an organic solvent or water for regulation of viscosity, and the like, thereby preparing a desired photosensitive, functional coating film-forming resin composition.

The thus prepared resin composition is coated to form a coating film on whole surface of the substrate including the colored coating films when formed in advance. The coating can be carried out by spin coating, roll coating, screen printing, offset printing, dip coating, or the like.

Subsequently, the coating film is exposed to light by the back light-exposure method, followed by development.

For the exposure, lights of various wavelengths can be used depending on the kind of resin composition. Generally, lights of which wavelength is in the UV region are preferable. Apparatuses using ultra-high pressure mercury lamp, metal halide lamp and the like as a light source can be used. Although the conditions of exposure vary depending on the kinds of light source and resin composition, the light exposure usually ranges from 100 to 4,000 mJ/cm$^2$. In the part exposed to light, a cross-linking reaction progresses, due to which the exposed part becomes insoluble and cures.

The exposure may be carried out in an atmosphere of nitrogen gas in order to prevent the retardation of cure caused by oxygen. Otherwise, the exposure may be carried out while providing an oxygen-intercepting layer composed mainly of polyvinyl alcohol.

The development is carried out for the purpose of dissolving and eliminating the unexposed part of the coating film. The elimination is achieved by contacting the coating film with an agent having an appropriate dissolving (developing) power and dissolving out the coating film. The agent is appropriately selected in accordance with the kind of resin composition. Usually, aqueous solutions of alkaline substances such as sodium hydroxide, sodium carbonate, quaternary ammonium salts, organic amines and the like or organic solvents such as esters, ketones, alcohols, chlorinated hydrocarbons and the like are used. The dissolution is carried out by the method of dipping or showering for a period of from about 30 seconds to about 5 minutes. After the dissolution, the remaining coating film is preferably washed thoroughly with water or an organic solvent.

The curing of the remaining coating film to obtain a desired functional coating film can easily be carried out by usual methods. For example, it can be achieved by heat-treatment at a temperature of 100°–280° C. for a period of 10–120 minutes.

There can be obtained a substrate carrying colored coating films thereon and functional coating films in the gaps of the colored coating films and being superior in properties such as dimensional accuracy, surface flatness, reliability or the like. The substrate obtained according to the present invention can be used as a color filter as it is. It is also possible to use the substrate as a color filter after forming an overcoat film (protecting film) in a conventional manner on the colored coating films and functional coating films, forming a transparent electroconductive film thereover for driving liquid crystal if necessary, and patterning the electroconductive film to circuits if necessary.

In the present invention, the formation of overcoat film can be omitted, because the substrate obtained according to the present invention is particularly superior in surface flatness and anti-chemicals.

Using the color filter manufactured according to the present invention, liquid crystal displays can be manufactured according to known methods.

According to the method of the present invention, there can be manufactured industrially advantageously a color filter having colored coating films and functional coating films in the gaps between the colored coating films, which is well prevented from light leakage, clear in coloration, excellent in optical properties and reliability, color contrast and surface flatness, and is usable for the manufacture of a liquid crystal display of high image quality.

The method of the present invention is explained in more detail with reference to the following example which is only illustrative.

EXAMPLE

1. Materials Used 1.1 Transparent Electroconductive Circuits-Carrying Substrate

ITO circuits (sheet resistance: α/□) each having a width of 200 μm were formed in parallel and linearly on a glass substrate having a thickness of 1.1 mm, at intervals of 40 μm (240 μm pitch).

1.2 Chemical Agent Soluble-Light Screening Coating Material

Titanium white and carbon black were dispersed in an aqueous solution of a maleinated polyester resin (trade name: Esbia TS#5000, manufactured by Shinto Paint Co., Ltd.); solid content 12% by weight.

1.3 Photosensitive, Functional Coating Film-Forming Resin Composition

Carbon-containing, negative photoresist composition, CK-2000 (trade name, manufactured by Fuji Hant Electronics Technology Co.) was used.

1.4 Photosensitive Material 1.4.1 Synthesis of Resin Having Photosensitivity and Function as a Binder A 3-l, four-necked flask equipped with a thermometer, a stirrer, a reflux condenser and a nitrogen inlet tube was charged with a composition of the following formulation:

| | |
|---|---|
| Polybutadiene resin (1-2 bond content: 83%, iodine value: 390, number average molecular weight: 1,000) | 250 parts by weight |
| Linseed oil (iodine value: 185) | 500 parts by weight |
| Maleic anhydride | 250 parts by weight |
| Xylene | 10 parts by weight |
| Trimethylhydroquinone | 2 parts by weight |

The content of the flask was reacted at 190°–200° C. for 5 hours in an atmosphere of nitrogen gas. Then, the unreacted maleic acid and xylene were distilled off. Thus, a maleinated mixed oil having a total acid value of 280 mg KOH/g was obtained.

Then, the maleinated mixed oil was cooled to 50° C. and air was blown to replace the nitrogen gas with air, after which the following materials were added:

Diethylene glycol dimethyl ether 320 parts by weight

2-Hydroxyethyl acrylate 290 parts by weight

Hydroquinone 1 part by weight

Then, 3 parts by weight of triethylamine was added, and the resulting mixture was heated at 80° C. to make progress a half-esterification. A viscous resinous liquid was obtained in two hours. Solid content: 79.5% by weight; acid value: 78 mg KOH/g; double bond content: 1.9 moles/kg.

1.4.2 Preparation of electrodeposition bath (blue, green and red)

TABLE 1

| | (parts by wt.) | | |
|---|---|---|---|
| | (b)-1 | (b)-2 | (b)-3 |
| Above-prepared resin | 125 | 125 | 125 |
| Ethyl cellosolve | 43.2 | 43.2 | 43.2 |
| Triethylamine | 9.8 | 9.8 | 9.8 |
| Phthalocyanine Blue (blue) | 17 | — | — |
| Phthalocyanine Green (green) | — | 17 | — |
| Quinacridone Red (red) | — | — | 17 |

Colored mixtures having the composition of Table 1 were each stirred at 1,800 rpm for 2 hours in the presence of glass beads. Then, 5 parts by weight of Irgacure 907 (photo initiator, manufactured by Ciba Geigy Ltd.) was added to each colored mixture, followed by stirring for an additional 15 minutes. The resulting dispersions were diluted with deionized water to obtain blue, green and red electrodeposition baths each having a solid content of 8% by weight.

2. Manufacture of Color Filter 2.1 Formation of Light-Screening Precoat Film

Using the coating material prepared in section 1.2, a coating film was formed on the circuits of substrate prepared in section 1.1 by electrodeposition at 30° C. for 10 seconds at 50 V. After thoroughly washing the precoat film with water, the film was prebaked at 70° C. for 10 minutes. The prebaked precoat film had a thickness of 2 μm and a light-screening rate of 98%.

2.2 Formation of functional coating film (black matrix)

The substrate obtained by the step of section 2.1 was coated with the resin composition 1.3 to form a coating film of a thickness of 2.5 μm. The coating film was then exposed to light emitted from the opposite side of the ITO circuit-carrying surface of the substrate using an ultra-high pressure mercury lamp (manufactured by Nippon Denchi) at a light exposure of 100 mJ/cm$^2$. After a development in a conventional manner to eliminate the unexposed coating film and the precoat film obtained in section 2.1, the substrate was thoroughly washed with isopropyl alcohol and deionized water, and then post-baked at 230° C. for 30 minutes. Thus, desired functional coating films of 2.0 μm thickness and 99% light-screening rate were formed in the gaps between ITO circuits, and no coating film was observed on the surface of ITO circuits.

2.3 Formation of colored coating films 2.3.1 Electrodeposition

Using the electrodeposition baths (b)–3, (b)–2 and (b)–1 obtained in section 1.4.2 in this order and using the functional coating films-carrying substrate as an anode, electrodeposition coating was carried out in a conventional manner so as to give red-, green- and blue-colored coating films each having a film thickness of 1.8 μm. In the above electrodeposition procedure, after the electrodeposition using (b)–3, (b)–2 and (b)–1 the substrate was washed with water in a conventional manner and prebaked at 90° C. for 15 minutes, respectively.

2.3.2 Light-Exposure

The substrate obtained in section 2.3.1 was exposed to light emitted from the opposite side of the coating films-carrying surface of the substrate using a high pressure mercury lamp manufactured by Nippon Denchi at a light exposure of 800 mJ/cm$^2$, and washed with 3% by weight aqueous solution of sodium hydroxide. Subsequently, the substrate was washed with deionized water until the specific resistance of the washing reached 500,000Ω•cm/25° C.

2.3.3 Baking

After evaporating the remaining water on the surface of the coating films at 80° C. for 5 minutes, the substrate was baked and dried at 200° C. for 30 minutes to obtain a desired color filter. The color filter obtained. was superior in surface flatness and had functional coating films of a light-screening rate of 99%, and clear red-, green- and blue-colored coating films located on ITO circuits with high-precision.

What is claimed is:

1. A method for manufacturing a color filter having colored coating films and functional coating films in the gaps between the colored coating films on a transparent substrate, which comprises step (a) of forming the colored coating films by an electrodeposition method using a transparent substrate having transparent electroconductive circuits on the surface thereof and an electrodeposition bath containing a photosensitive material selected from the group consisting of:

(i) polymers having photosensitivity and function as a binder in electrodeposition, and (ii) compositions comprising a photosensitive compound and a polymer having function as a binder in electrodeposition, and step (b) of forming the functional coating films by forming a coating film using a photosensitive, functional coating film-forming resin composition on whole surface of the substrate including the colored coating films, if any, and then exposing the coating film to light emitted from the opposite side of the circuits-carrying surface of the substrate, followed by development, the steps (a) and (b) being carried out in this order or vice versa.

2. A method according to claim 1, wherein the photosensitive material has an acid value of from 15 to 150 mg KOH/g and a double bond content of 0.1 to 5 moles/Kg.

3. A method according to claim 1, wherein the photosensitive, functional coating film-forming resin composition is a black coloring material-containing negative photoresist composition.

4. A method according to claim 3, wherein the black coloring material is a member selected from the group consisting of metal oxide black pigments, carbon black, bismuth sulfide and black dyes.

5. A method according to claim 1, wherein the electrodeposition method is carried out by applying a direct current voltage of 10 to 300 V for about 1 second to about 3 minutes using the electroconductive circuits patterned on the substrate as an anode.

6. A method according to claim 1, wherein the light-exposure in step (b) is carried out at a light exposure of 100 to 4,000 mJ/cm$^2$.

7. A method according to claim 1, wherein the development is carried out using a developing agent selected from the group consisting of sodium hydroxide, sodium carbonate, quaternary ammonium salts, organic amines and organic solvents.

8. A method according to claim 1, wherein the colored coating films and the functional coating films are formed in this order, and then both films are exposed to light emitted from the opposite side of both films-carrying surface of the substrate.

9. A liquid crystal display provided with the color filter manufactured by the method of claim 1.

* * * * *